INVENTOR:
JOHANNES E. RIJNSDORP
BY: *signature*
HIS ATTORNEY

INVENTOR:
JOHANNES E. RIJNSDORP

INVENTOR:
JOHANNES E. RIJNSDORP
BY:
HIS ATTORNEY

United States Patent Office 3,342,701
Patented Sept. 19, 1967

3,342,701
CONTINUOUSLY OPERATING SUPERATMOSPHERIC DISTILLATION PROCESS CONTROL AND APPARATUS THEREFOR
Johannes E. Rijnsdorp, Amsterdam, Netherlands, assignor to Shell Oil Company, New York, N.Y., a corporation of Delaware
Filed Feb. 24, 1964, Ser. No. 346,781
Claims priority, application Netherlands, Mar. 19, 1963, 290,361
8 Claims. (Cl. 203—2)

This invention relates to a method and apparatus for the control of a continuously operating distillation process. More particularly, this invention relates to a method and apparatus for the control of a process for the continuous distillation of a variable stream of an intake mixture which is carried out at superatmospheric pressure in a multitray distillation column having both stripping and rectifying sections; wherein both reflux in the top and re-evaporation in the bottom portion of the distillation column are used; and in which the rate of flow of the intake mixture remains independent of the conditions in the distillation process, whereby the operating costs of the process are minimized.

In is a general practice in the industry to provide automatic control for continuous distillation processes. Suitable correcting conditions in this regard are, in general, the amount of reflux, the degree of heat applied in aid of the re-evaporation (to the reboiler), the top product flow (take-off), the bottom product flow (take-off), the degree of cooling in the condenser, and the degree of preheating of the feed. The quality of the products is normally kept constant by controlling these conditions to maintain predetermined temperatures and pressures in the column.

Known control systems have their drawbacks since temperature and pressure are not always good criteria for product quality. Furthermore, operating at the predetermined pressures and temperatures which would result in the required quality of the products, does not always result in the optimization of the operating costs for the process. With the advent of suitable stream analyzers for producing a direct indication of the quality of the process products, it now becomes possible to remove the necessity of controlling the column pressure to a predetermined value. Since the variable costs of operating a distillation process are determined mainly by the cost of preheating the feed together with the cost of heating in aid of re-evaporation, and since the degree of re-evaporation is directly related to the pressure in the column, then if the process is controlled such that the pressure in the column is free to vary within the permissible operating limits of the column and the heat which is supplied to the reboiler is controlled in such a way that the minimum amount of heat need be transferred from the reboiler to the condenser to perfect the desired separation, the variable operating costs for the process can be reduced to a minimum.

As is often the case in practice, the components to be separated by the distillation have an increasing relative volatility at decreasing pressure. If now, the process is controlled in such a way that the pressure automatically adjusts itself to the lowest value at which the distillation process still produces the desired results, then accordingly as the pressure becomes lower, less reflux and vapor flow are required to obtain a desired separation. This implies that less heat need be transferred from the reboiler to the condenser to perfect the desired separation. This is obtained by supplying less heat to the reboiler, resulting in a reduction of the variable costs for the process.

The basic control scheme for controlling a distillation column in this manner is described in copending application Ser. No. 330,753 filed Dec. 16, 1963, by J. E. Rijnsdorp, entitled, "Method and Apparatus for the Control of a Continuously Operating Distillation Process."

It should be noted that the economy of the distillation process usually benefits less from adjustment of the feed preheat than from the pressure being allowed to adjust itself freely. If it is desired to take full advantage of this influence of the preheating and thereby reduce the variable costs to a minimum, it is necessary to ascertain whether the preheating of the feed is provided by a relatively expensive or a relatively cheap source of heat in comparison with the source employed for the re-evaporation. If the cost of the source of heat for preheating is relatively expensive as compared with the cost of the source of heat used for re-evaporation, preheating should be used as little as possible or not at all. On the other hand, if comparatively cheap sources of heat are available for the preheating, then the preheating should be utilized to the fullest to minimize the operating costs for the process. In the control schemes according to the present invention, it is assumed that a relatively expensive source of heat is available for preheating.

The cost of the distillation process can also be reduced by utilizing the column to its maximum extent by providing for the vapor and liquid loads of the trays in the column to be as high as possible. This results in increased production for the column and therefore tends to reduce the cost of distillation per unit of feed. The load of a tray in a distillation column is determined by the liquid flow and vapor flow through that tray. When the feed stream increases, the liquid flow and the vapor flow increases as a result of which the load of the trays also increases. In order that the yield on the capital invested in the plant be as high as possible, it is therefore desirable that the feed stream be also as high as possible, the limit generally being set by the load limit of the trays. According to the invention, the controls for the column required to prevent overloading of the trays are performed automatically while preserving, however, the automatically set minimum values of reflux flow and vapor flow which, at that given feed stream, still afford the desired separation. Thus, it is possible to utilize a feed stream flow which is equal to the maximum permissible value.

It should also be noted that in various operating pressure ranges for the distillation column, the load on the trays of the column may either increase or decrease with increasing pressure. The control schemes according to the invention are for a distillation process operating in a pressure range where the tray load decreases with increasing pressure. This is the range where the vapor density has a large influence on the tray load. Control schemes for controlling a distillation process operating in a pressure range where the tray load increases with increasing pressure are shown in copending applications P–5649 and P–5852, Ser. Nos. 338,765 and 343,545, filed Jan. 20, 1964 and Feb. 10, 1964, respectively, by J. E. Rijnsdorp.

Although as pointed out above, the control schemes according to the invention do not maintain the pressure in the column at a predetermined value but rather allow the pressure in the column to freely adjust itself between the maximum and minimum permissible operating pressure for the column, sudden or transient pressure variations in the column may disturb the smooth and orderly control of the distillation process. Accordingly, it is another feature of this invention to provide control for the process whereby sudden pressure variations in the column pressure are suppressed while still allowing the pressure in the column to freely adjust itself.

It is therefore the primary object of this invention to provide a method and apparatus for controlling a process for the continuous distillation of a stream of intake mixture wherein the costs of operating the process are reduced to a minimum.

It is a further object of this invention to provide a method and apparatus of controlling a distillation process for the continuous distillation of a variable stream of intake mixture wherein: the pressure in the column is permitted to freely adjust itself within the permissible limits of the column pressure; the minimum possible quantity of heat is utilized for preheating the feed; and the degree of cooling supplied by the condenser is adjusted to maintain the load on the trays in the distillation column at values not exceeding the maximum permissible tray loads, whereby the cost of operating the distillation process is minimized when distillation takes place in a pressure range where the tray load decreases with increasing pressure and where the cost of the heating medium used for preheating the feed is relatively expensive in comparison with the cost of the heating medium utilized for re-evaporation.

It is still a further object of this invention to provide a method and apparatus for the control of a process for the continuous distillation of an intake mixture containing components having an increasing relative volatility at decreasing pressure wherein the pressure in the column automatically adjusts itself to the lowest value at which the process produces the desired results; the minimum possible quantity of heat is utilized for preheating the feed; and the degree of cooling supplied by the condenser is adjusted to maintain the loads on the trays in the distillation column at values not exceeding the maximum permissible tray loads, whereby the cost of operating the distillation process is minimized when distillation takes place in a pressure range where the tray load decreases with increasing pressure and where the cost of the heating medium used for preheating the feed is relatively expensive in comparison with the cost of the heating medium utilized for re-evaporation.

It is still a further object of this invention to provide a method and apparatus for the control of a process for the continuous distillation of a variable stream of intake mixture wherein the pressure in the column automatically adjusts itself to the lowest value at which the process still produces the desired results; sudden pressure variations in the column are suppressed; the minimum possible quantity of heat is utilized for preheating the feed; and the degree of cooling supplied by the condenser is adjusted to maintain the loads on the trays in the distillation column at values not exceeding the maximum permissible tray loads, whereby the cost of operating the distillation process is minimized when distillation takes place in a pressure range where the tray load decreases with increasing pressure and where the cost of the heating medium used for preheating the feed is relatively expensive in comparison with the cost of the heating medium utilized for re-evaporation.

Briefly, according to the invention, the above objects are obtained by controlling the amount of reflux, the degree of re-evaporation, the top product flow, and the bottom product flow such that the quantity of the top product formed as represented by the level of the top product accumulator, and the quantity of the liquid present in the bottom of the column vary between predetermined acceptable limits and the quality of the separation obtained satisfies the desired requirements. The supply of cooling medium to the top product condenser is then maintained at the maximum quantity which will allow the column to operate at a pressure which is not below the minimum permissible pressure for the column; the quantity of heat utilized in preheating the feed is maintained at the minimum possible value which will allow the column to function properly; and, the loads of the trays of both the rectifying and stripping sections of the column are prevented from exceeding their respective maximum permissible loads.

The pressure in the column is prevented from dropping below the minimum permissible value determined for the column by measuring the pressure in the column and reducing the supply of cooling medium to the condenser whenever the measured pressure drops below the permissible minimum value.

The pressure in the column is likewise prevented from rising above the maximum permissible value determined for the column by decreasing the degree of re-evaporation whenever the measured pressure arises above the maximum permissible value.

The load of the trays of the stripping section of the column is prevented from rising above the maximum permissible load for the trays by increasing the quantity of heat utilized for preheating, and as shown in some of the embodiments, decreasing the degree of condenser cooling, whenever the maximum permissible load of one or more trays of the stripping section is exceeded. The result of increasing the quantity of heat utilized for preheating is that the flow of liquid from the feed tray to the reboiler, i.e., the flow of liquid in the stripping section, is decreased, resulting in a decrease in the load on the stripping section trays. As a result of the liquid flow in the stripping section being decreased, the vapor flow in that section can also be decreased while still preserving the desired separation, resulting in a further reduction in the load of the trays in the stripping section.

The load of the trays of the rectifying section of the column is prevented from rising above the maximum permissible load of the trays by decreasing the degree of condenser cooling whenever the measured load of one or more rectifying section trays rises above the maximum permissible value. The result of this correcting action is that the vapor density in the column is increased, resulting in a decrease in the tray load of the rectifying section trays.

The objects and advantages of the present invention will be understood from the following description taken with reference to the attached drawings wherein.

Figure 1:
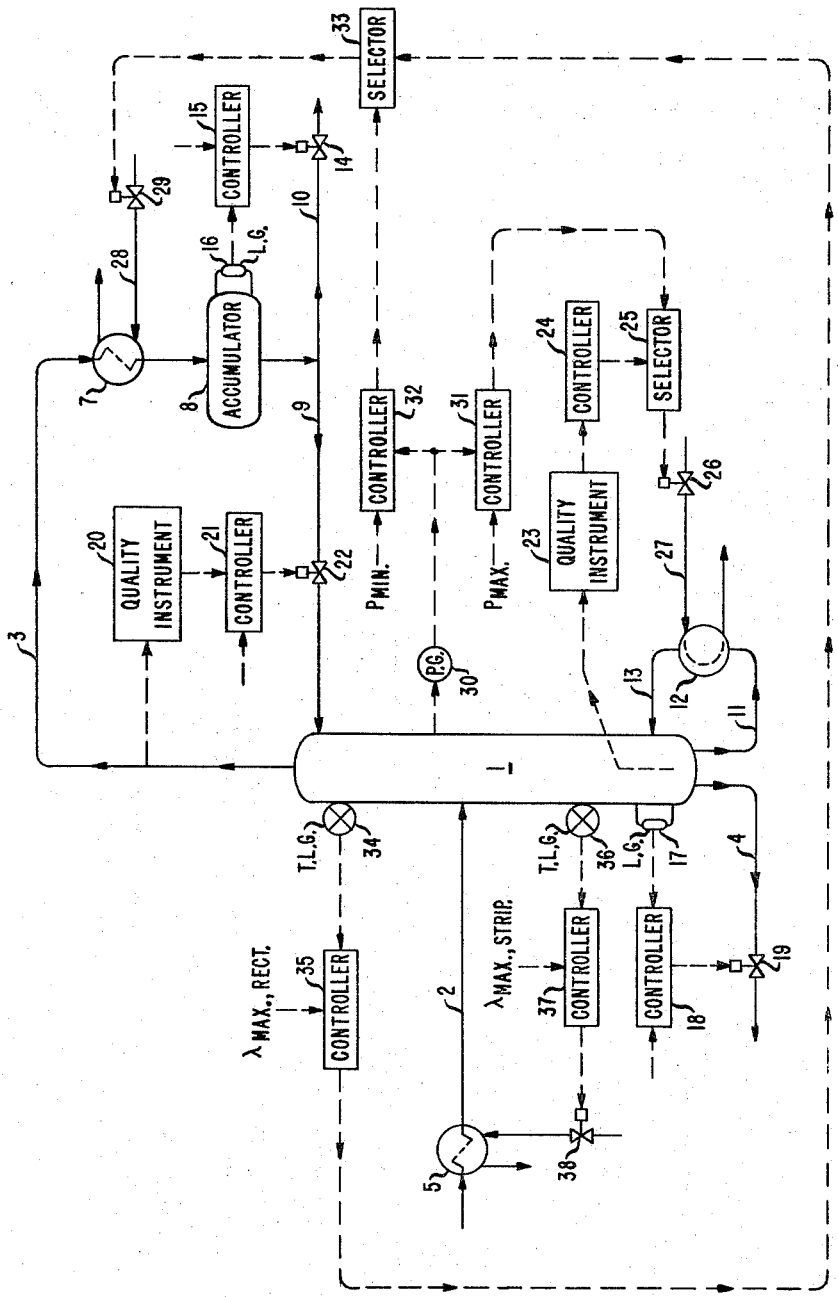
FIGURE 1 is a diagrammatic representation of the basic control scheme according to the invention.

Referring now to the drawings wherein like reference numerals in each of the figures refer to the same structure, FIGURE 1 is a diagrammatic representation of the basic control scheme according to the invention for a multi-tray distillation column 1 which contains both a rectifying and a stripping section and operates at a pressure above atmospheric. The feed or intake mixture is continually introduced in either a liquid or vapor form into the column 1 to an intermediate stage through a pipeline 2; the top product in the vapor phase is discharged through a pipeline 3; and the liquid bottom product is discharged through a pipeline 4. Coupled to the feed pipeline 2 is a heat exchanger 5 for preheating the feed. Although only one heat exchanger is shown, obviously a plurality of heat exchangers may be used if required.

Connected to the top product column discharge line 3 is a condenser 7 which condenses the vapor in the line 3; the condensate then flows into an accumulator 8. A part of the condensate from the accumulator 8 is returned to the top of the column 1 for reflux by a pipeline 9, while the liquid top product is discharged from the accumulator via a discharge pipeline 10.

Re-evaporation for the column 1 is effected by passing a stream of liquid from the bottom of the column via a pipeline 11 to a reboiler 12 which may, for example, be a heat exchanger, and returning the heated stream via a pipeline 13 to the column 1. The particular manner in which re-evaporation is attained, however, forms per se no part of this invention since re-evaporation may be accomplished in other ways, e.g., with a heating coil in the bottom of the column.

Before discussing the particular control of the process a distinction must be made between, inter alia, controlled conditions and correcting conditions. The controlled conditions are those variables in the process which are controlled in such a way that in general the difference between the measured value of the variable and the set or desired value of this variable is decreased. This is accomplished by adjusting other variables or correcting conditions of the process. In the present case, the amount of reflux, the degree of re-evaporation, the rate of top product flow, the rate of bottom product flow, the degree of cooling in the condenser, and the degree of preheating of the feed are suitable as correcting conditions. Of these correcting conditions, four, namely, the reflux, the re-evaporation, and the top and bottom product flows, are adjusted in dependence on the following four controlled conditions: the quality of the top product, the quality of the bottom product, the top product accumulator level, and the bottom level, i.e., the liquid level in the bottom of of column 1. The remaining two correcting conditions, i.e., the degree of cooling by the condenser and the degree of preheating are adjusted respectively to their maximum and minimum values which will permit the process to function properly.

It should be noted that the present process is conceived as a distillation in which the feed rate may vary independently of the other conditions in the distillation process, that is, the distillation column should function properly regardless of the quantity of feed supplied. Processes of this type frequently occur in oil refineries where the feed distilled often originates from another part of the refinery and storage tanks for this feed are not available or cannot be used. The feed streams can, however, be controlled to a constant or substantially constant value, for example, when storage tanks are available, without requiring any change in the control schemes forming this invention.

As shown in FIGURE 1, the top product flow is adjusted by means of a controllable valve 14 connected in the pipeline 10. The valve 14 is controlled by means of a controller 15 which compares the measured value of the level in the accumulator 8, as determined by the level gauge 16, with a signal proportional to the desired level in the accumulator, i.e., the set value of the controller. Any differences resulting from the comparison produce an output signal from the controller 15 which tends to adjust the valve 14 in such a way that the difference is decreased. Thus, if at a given moment, the measured value of the accumulator level is larger than the set value, the signal supplied from the controller 15 tends to open the valve 14 wider. In a similar manner, the bottom level is maintained at the desired value with the aid of a level gauge 17, a controller 18, and a control valve 19 in the pipeline 4.

The amount of reflux for the column 1 is controlled by means of a quality measuring instrument or meter 20 which analyzes the quality of the top products flowing through the pipeline 3 and transmits a signal corresponding to the separation to a controller 21 wherein the measured and desired quality of the top product are compared. The output signal from the controller 21 is coupled to a control valve 22 in the pipeline 9. If the measured quality is too low, the output signal from the controller 21 tends to open the valve 22 wider and thus increase the amount of reflux; the reverse occurs if the measured quality proves to be too high.

The degree of re-evaporation necessary to attain the desired separation in the distillation column is controlled by means of a quality instrument 23 which measures the quality of the bottom product and transmits a signal corresponding to the separation obtained to a controller 24, wherein the measured and desired values of the quality of the bottom products are compared. The output signal from the controller 24 is coupled via a signal selector 25, which will be more fully explained below, to a control valve 26 which is located in the heating medium supply line 27 for the reboiler 12. If at a given moment the quality of separation is too low, the valve 26 is opened wider; thereby increasing the degree of re-evaporation. The reverse occurs if the measured quality appears to be too high.

The cooling medium for the condenser 7 is supplied through a pipeline 28 having a control valve 29 connected therein. In order to allow the pressure in the column 1 to reach the lowest possible value at which the process will operate satisfactorily, the control valve 29 is normally open as wide as possible. With the embodiment chosen in this example, the valve is opened as wide as possible if the signal supplied to the valve is at a maximum value.

In order to insure that the pressure within the column does not vary outside of the permissible pressure range for the column, the pressure in the column is measured by means of a gauge 28 which is coupled to a pair of controllers 31 and 32. The controller 31 compares the value of the measured pressure with the desired value corresponding to the maximum permissible pressure ($P_{max}$) for the column. As long as the pressure in the column does not exceed $P_{max}$, the output signal from controller 31 is maintained at a maximum value. This output signal and that from the controller 24 are transmitted to the signal selector 25 which has an output signal equal to the lower value of its two input signals. Since under normal operating conditions, the pressure in the column is lower than $P_{max}$, the output signal from the controller 31 is maintained at its maximum value; the result is that the output signal from the controller 24 is transmitted to the valve 26 to control the quality of the separation. Should the pressure in the column become higher than $P_{max}$, however, the output signal from the controller 31 then becomes smaller in value until it is transmitted by selector 25 to the valve 26 in lieu of the signal from the controller 24; this causes the valve 26 to be closed an amount sufficient to bring the pressure in the column approximately equal to $P_{max}$. Controller 32 prepares the value of the measured pressure with a value corresponding to the minimum permissible operating pressure ($P_{min}$) of the column. As long as the pressure in the column is higher than $P_{min}$, the output signal from controller 32 is at a maximum value. The output signal from controller 32 is transmitted via a signal selector 33, whose function will be more fully explained below, to the control valve 29. Since under normal operating conditions the pressure in the column is higher than $P_{min}$, the output signal from controller 32 is maintained at its maximum value and therefore tends to maintain the valve 29 in its maximum open position. Should the pressure in the column become lower than $P_{min}$, the output from controller 32 begins to decrease, causing the valve 29 to close an amount sufficient to bring the pressure within the column approximately equal to $P_{min}$. It should be noted that for practical reasons it is recommendable to allow for a small safety margin in the set values of the controllers 31 and 32, i.e., the set values should be set at values corresponding to pressures respectively slightly below the maximum and slightly above the minimum pressures for the column.

The degree of cooling supplied by the condenser 7 is also adjusted, as hereinbefore indicated, in response to the load of the trays in the rectifying section of the column 1, i.e., the degree of cooling supplied by the condenser 7 is decreased whenever the maximum tray load for the rectifying section trays is exceeded. As shown in the figure, the load of the trays in the rectifying section is measured with a tray load gauge 34. The output signal from the gauge 34 is connected to a controller 35 which compares this signal with a set value corresponding to the maximum permissible rectifying section tray load, $\lambda_{max.\ rect.}$. The output signal from controller 35 provides the second input for the selector 33 which, as with selector 25 above, produces an output signal equal to the lowest value of its two input signals. As long as the load of the trays in the rectifying section does not exceed $\lambda_{max.\ rect.}$, the output signal from controller 35 is maintained at a maximum value which preferably is equal to or slightly greater than the maximum output signal from controller 32. Assuming that the column is operating in the permissible pressure operating range and that the load of the rectifying section trays has not exceeded $\lambda_{max.\ rect.}$, the output signals from controllers 32 and 35 are then both at their maximum values; resulting in the selector 33 passing a maximum value signal to the valve 29 and thereby maintaining the valve 29 in its maximum open position. Should the load on the rectifying section trays become larger than $\lambda_{max.\ rect.}$ however, the output signal from controller 35 begins to decrease as a result of which selector 33 passes this output signal to valve 29 to further close the valve until the measured load has decreased to approximately $\lambda_{max.\ rect.}$.

In order to insure that the maximum load of the trays in the stripping section of the column 1 is not exceeded, the load of the trays in this section is measured by means of a second tray load gauge 36. The output signal from gauge 36 is connected to a controller 37 which compares the measured value of the tray load with a set value corresponding to the maximum permissible stripping section tray load, $\lambda_{max.\ strip.}$. The output signal from the controller 37, which is maintained at a maximum value so long as the load on the trays of the stripping section does not exceed $\lambda_{max.\ strip.}$, is connected to a control valve 38 which controls the quantity of heat supplied to the preheater 5. Since in the present control scheme it is assumed that the cost of heat used for the preheating is relatively expensive and that therefore the minimum possible quantity of heat should be supplied to the preheater 5, valve 38 is normally maintained in its maximum closed position. This position is maintained when the signal supplied to the control valve 38 is of a maximum value. As long, therefore, as the load of the trays in the stripping section does not exceed $\lambda_{max.\ strip.}$, the output signal from the controller 37 is at a maximum value and the control valve 38 is maintained in the closed position. If the load becomes larger than $\lambda_{max.\ strip.}$, the output signal from controller 37 becomes smaller, as a result of which the valve 38 is further opened until the load on the trays in the stripping section becomes approximately equal to $\lambda_{max.\ strip.}$.

It should be noted, that in determining the value of the maximum permissible load for the trays, it is not only necessary to pay attention to the dimensions of the trays, but further, the influence of the dynamics of the system and the clearances in various parts of the trays should be considered. This results in the set value of the maximum permissible tray load of the controllers being slightly lower than the maximum value specified for the trays.

Figure 2:
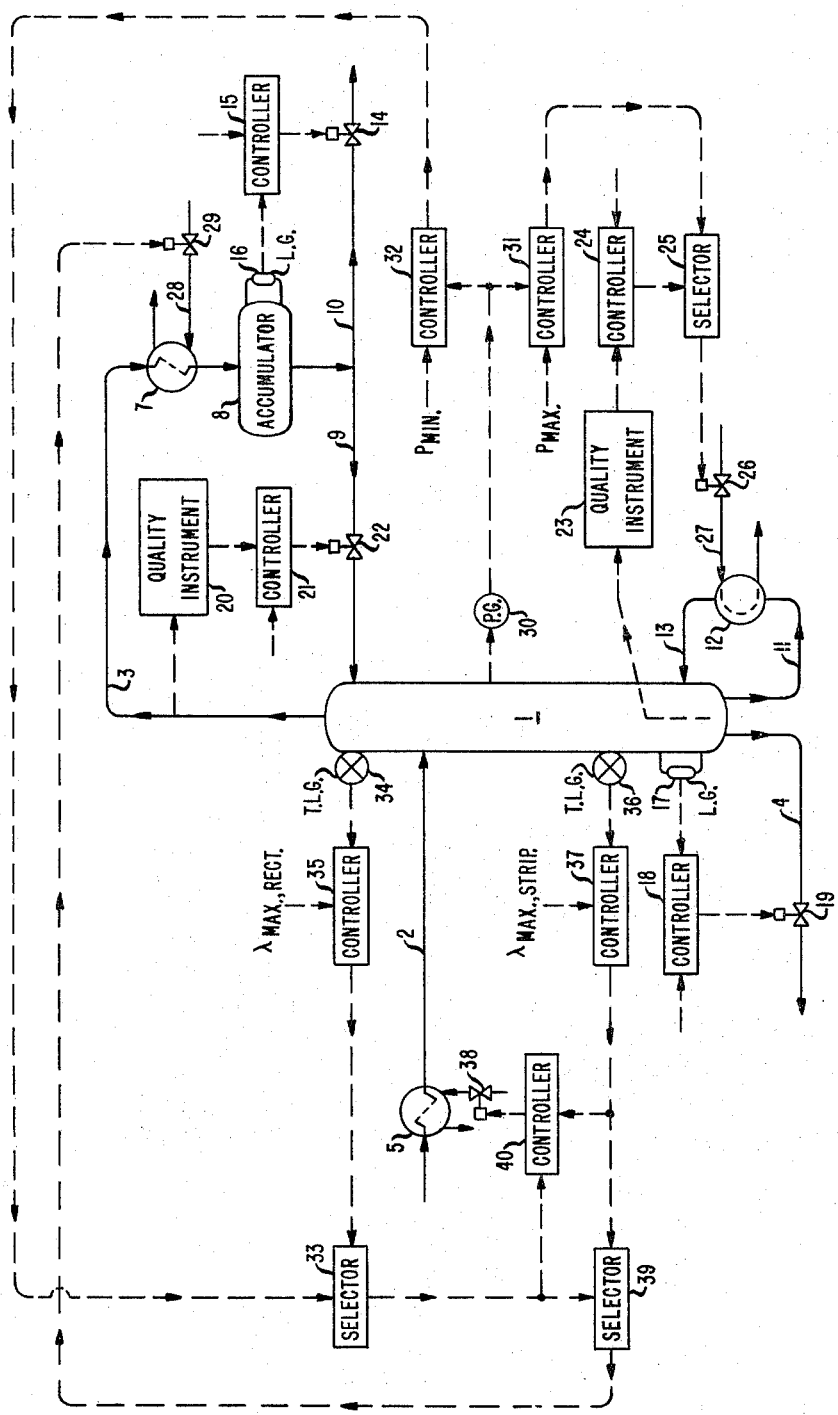
FIGURE 2 is a diagrammatic representation of a modification of the basic control scheme wherein overloading of the stripping section trays is eliminated by simultaneously adjusting the degree of preheating and the degree of condenser cooling.

Referring now to FIGURE 2, there is shown a mode of control which is particularly advantageous of the event of rapid and large variations in the load of the trays. With this mode of control, the elimination of an overload of the stripping section trays is brought about by two simultaneously occurring correcting actions, i.e., via the feed preheater and via the condenser. As shown in the figure, the output signal from the minimum pressure controller 32 and the rectifying section load controller 35 are again connected to respective inputs of the signal selector 33. In this embodiment of the invention, however, the output signal from signal selector 33 is not connected directly to the control valve 29, but rather is first connected to the input of another signal selector 39. The signal selector 39 compares the output signal from selector 33 with the output signal from the stripping section controller 37 and passes the signal having the lowest value to the control valve 29 to adjust the quantity of cooling medium supplied to the condenser 7.

Assuming that the maximum loads on the trays of the stripping and rectifying sections of the column are not exceeded, the outputs from the controllers 35 and 37 are then at their maximum values and consequently the signal selectors 33 and 39 pass the signal from the controller 32 to the control valve 29 to maintain the valve 29 in the maximum open position which will permit operation in the permissible pressure operating range. Should, however, the maximum permissible tray load for the rectifying section trays be exceeded, then the output signal from the controller 35 begins to decrease unit it becomes less than the signal from the controller 32, at which point it is passed by the signal selector 33 to the signal selector 39. The signal selector 39 then compares the output signal from controller 35 with the output signal from the stripping section controller 37 and, since it is assumed that the maximum permissible load for the trays of the stripping section has not been exceeded, passes the output signal from controller 35 to the valve 29, tending to close the valve 29 until the load on the rectifying section trays has decreased to approximately $\lambda_{max.\ rect.}$. Similarly, should the load on the stripping section trays be exceeded, then the output signal from controller 37 begins to decrease and is passed by the selector 39 to the valve 29; again tending to close the valve 29 until the load on the stripping section trays has been reduced to approximately $\lambda_{max.\ strip.}$.

The input signal from the controller 37 is also connected to one input of a controller 40 which compares this signal to the output signal of signal selector 33. The controller 40, the output of which is utilized to adjust the control valve 38 which adjusts the quantity of heat supplied to the preheater 5, produces a maximum output signal as long as the output signal from the controller 37 is at a maximum value and thereby maintains the control valve 38 in its maximum closed position as long as the tray load does not exceed $\lambda_{max.\ strip.}$. In the event that the output signal from controller 37 is less than that from selector 33 and thereby indicating that the maximum tray load for the stripping section has been exceeded, the output signal from controller 40 then causes the valve 38 to be further opened until the two signals reaching controller 40 become equal. This correcting action increases the degree of preheating of the feed, resulting in the load on the trays in the stipping section being decreased below the maximum permissible load. It should be noted that the order of the connections of the controllers 32, 35 and 37 to the selectors 33 and 29 can be permuted.

Figure 3:
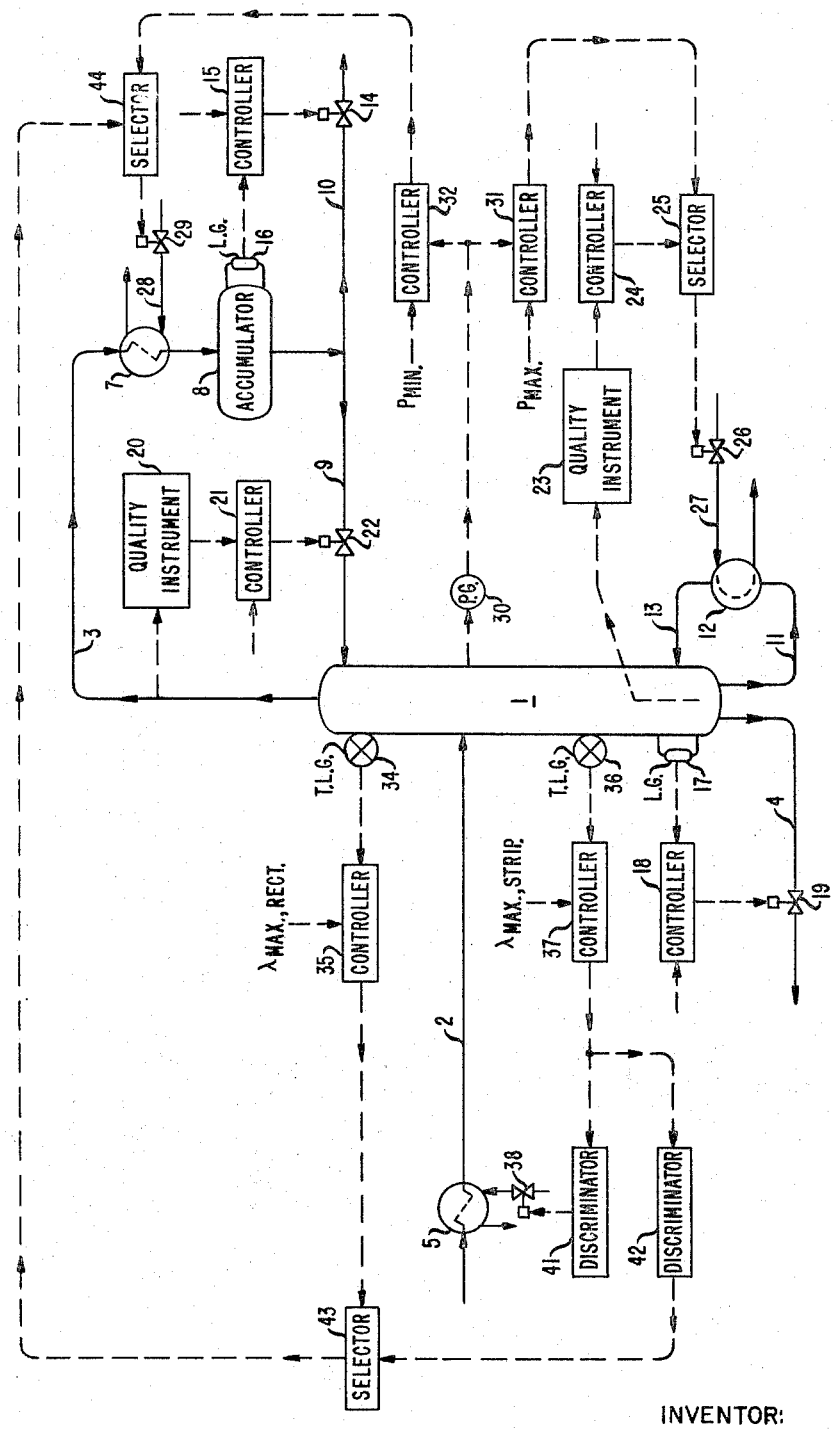
FIGURES 3–5 are modifications of the basic control scheme wherein overloading of the trays of the stripping section of the column is eliminated by sequentially increasing the degree of preheating and decreasing the degree of condenser cooling.

Refering now to FIGURE 3, there is shown a control scheme to alleviate the overloading of the trays in the stripping section by successively adjusting the preheater and the condenser. Such a control scheme is of particular importance, when, due to large variations in the load of the trays in the stripping section, the load of these trays cannot be reduced below the maximum permissible load by merely increasing the degree of preheating of the feed, i.e., the load of the trays of the stripping section of the column is not reduced below the maximum permissible load for the trays even when the feed preheater is operating at maximum capacity. According to this control scheme, the output signal from the controller 37 is passed through a pair of signal amplitude discriminators 41 and 42. The discriminator 41 passes the signal from the controller 37 to the control valve 38 so long as the signal from controller 37 is between its maximum value and a predetermined intermediate value which preferably corresponds to that value of the output signal of controller 37 at which the valve 38 is completely open. The discriminator 42 is set to pass a value corresponding to the maximum output signal from the controller 37 to a signal selector 43 during the time that discriminator 41 is passing the output signal from controller 37 to the control valve 40. Once the output signal from controller 37 has decreased in value below the predetermined intermediate value mentioned above, discriminator 42 then passes the output signal from controller 37 to the selector 43.

To the second input of the signal selector 43, which produces an output signal equal to the lesser of its two input signals, is connected the output from the rectifying section controller 35; the output signal from the signal selector 43 being connected to one input of another signal selector 44 which functions similarly to signal selector 43 and has the output of controller 32 connected to its second input. With this control scheme, as long as the loads on the trays in the rectifying and stripping sections of the column do not exceed their respective maximum permissible values, the output signals from controllers 35 and 37 are at their maximum values and hence the valve 29 is under control of the controller 32, i.e., the valve 29 is maintained at the maximum open position which will allow the column to operate at a pressure which is not less than $P_{min}$. Should the maximum permissible load of the rectifying section trays be exceeded, then, as in FIGURE 2, the output signal from controller 35 begins to decrease until it is passed by selectors 43 and 44 to the valve 29 to further close the valve 29 until the overload of the rectifying section trays is alleviated.

With respect to the control for overloading of the trays of the stripping section, as long as the load on these trays does not exceed the maximum permissible load, the output signal from controller 37 is at a maximum value, and hence is passed via the discriminator 41 to the control valve 38 to maintain the valve in its maximum closed position. Should the maximum load on the trays in the stripping section of the column be exceeded, however, the output signal from controller 37 begins to decrease and is then passed via the discriminator 41 to the control valve 38 to further open this valve and thereby increase the quantity of heat supplied for preheating. The controller 37 continues to try to reduce the overload on the stripping section trays via the control valve 38 until the output signal from controller 37 has reached the preset intermediate value indicating that the control valve 38 is completely open. At this time, if the output signal from controller 37 is still decreasing, indicating that an overload of the stripping section trays still exists, the output signal from controller 37 is passed by the discriminator 42 and the selectors 43 and 44 to the control valve 29 to reduce the amount of cooling medium supplied to the condenser 7, and thereby reduce the overload on the stripping section trays. It should be noted that during the time the output signal from the controller 37 is being passed by the discriminator 41, the discriminator 42 is passing a maximum output signal and hence does not affect the position of control valve 29. Although the control scheme has been described for complete sequential operation, it is possible by proper selection of the range of operation of the discriminators 41 and 42 to institute control via the control valve 29 at any desired point.

Furthermore, it should be noted that the function of the discriminators 41 and 42 can be performed by valve positioners interconnecting the valves 29 and 38. Obviously if such valve positioners are utilized the discriminators 41 and 42 may be eliminated. As with the embodiment shown in FIGURE 2, the connections of the controllers 32 and 35 and of the discriminator 42 to the signal selectors 43 and 44 may be permuted.

Figure 4:
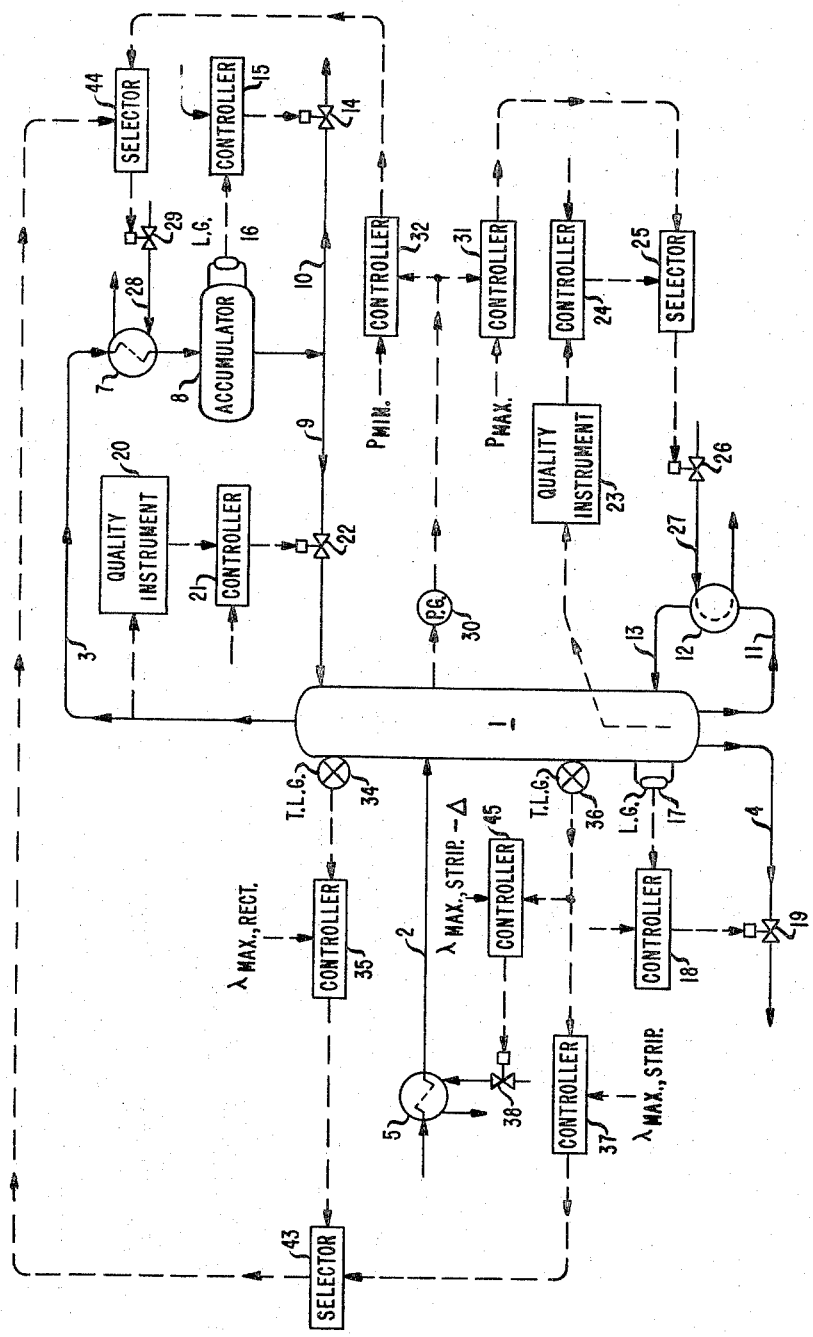

Referring now to FIGURE 4, there is shown an alternative control scheme for the mode of control represented by FIGURE 3. According to this control scheme, the signal from the stripping section tray load gauge 36 is passed to the controller 37 and to a second controller 45. The set value of the controller 37 corresponds to the maximum permissible value of the load for the tray of the stripping section, $\lambda_{max.\ strip.}$, while the set value for the controller 45 is slightly lower than that of the controller 37. The controller 37 compares the output signal from the gauge 36 with the maximum permissible load for the stripping trays, $\lambda_{max.\ strip.}$, and produces a maximum output signal as long as the measured load does not exceed $\lambda_{max.\ strip.}$. The output signal from the controller 45 is maintained at a maximum value as long as the gauge 36 is not measuring any value larger than $\lambda_{max.\ strip.} = \Delta$, that is, a slightly smaller value than $\lambda_{max.\ strip.}$. With this control scheme, the output signal from the controller 45, which controls the positioning of the control valve 38, begins to decrease at an earlier moment in time than the output signal from the controller 37 as the load of the trays in the stripping section approaches $\lambda_{max.\ strip.}$; thereby beginning to open the valve 38 at an earlier moment than that at which the valve 29 begins to close. The result of this action is that with increasing load, the degree of preheating of the feed is already increasing just a moment before $\lambda_{max.\ strip.}$ is reached. If the effect of increasing the degree of preheating of the feed is still inadequate to maintain the load of the stripping section trays below $\lambda_{max.\ strip.}$, then the control valve 29 is additionally further closed via the controller 37. This mode of control performs particularly favorably when variations in the load occur rapidly. It should be noted that as with the previous control schemes, the connection of the controllers 32, 35 and 37 to the selectors 43 and 44 can be permuted.

Figure 5:
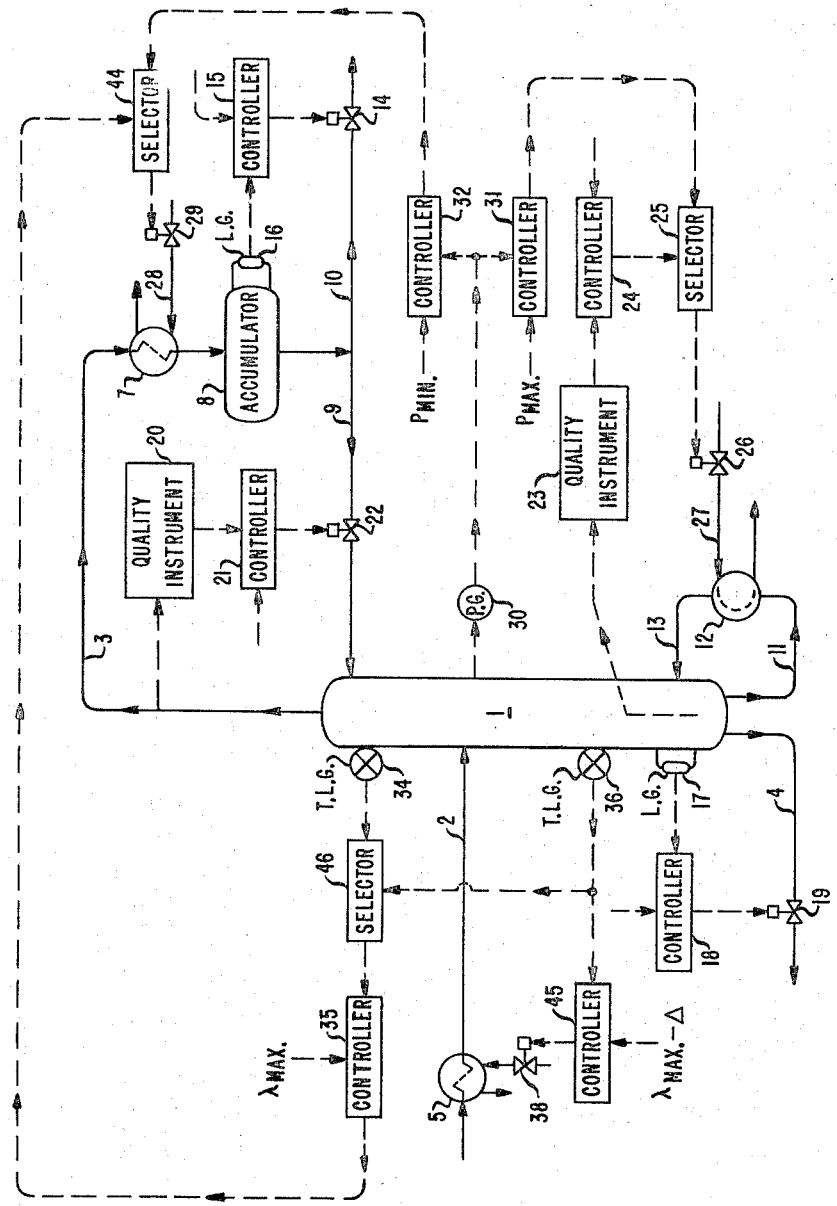

Similar results to that reached with the control scheme shown in FIGURES 3 and 4 are reached with the mode of control according to FIGURE 5. When utilizing the control scheme of FIGURE 5, tray load gauges 34 and 36 are adjusted such that their output signals are equal when the largest permissible tray loads in the two sections of the column are reached, i.e., the values of $\lambda_{max.\ strip.}$ and $\lambda_{max.\ rect.}$ are equal ($\lambda_{max.}$). The output signal from the tray load gauge 36 is connected both to the controller 45 and to a signal selector 46 which is connected between the tray load gauge 34 and the controller 35. As opposed to the signal selectors described in the aforementioned control schemes, signal selector 46 produces an output signal equal to the maximum value of its two input signals and, therefore, transmits a signal corresponding to the largest tray load of the controller 35. If the value of the tray load in the stripping section measured by the gauge 36 becomes larger than $\lambda_{max.} = \Delta$, the output signal from the controller 45 causes the valve 38 to be further opened. Should the opening of the valve 38 not have the desired effect of stopping the increase in the load of the trays in the stripping section, then as the stripping section tray load continues to increase, the output signal from tray load gauge 36 also continues to increase until it reaches a value equal to $\lambda_{max.}$, which is the set value of controller 35. As soon as the input signal to controller 35 from signal selector 46 exceeds $\lambda_{max.}$, the output signal from controller 35 begins to decrease and close the control valve 29 via the signal selector 44 as explained above. In a similar manner, if the maximum permissible load for the trays in the rectifying section of the column is exceeded, the output signal from the tray load gauge 34 causes controller 35 to vary the position of control valve 29 to decrease the load on the trays. It should again be noted, that the order of connecting the controllers 32 and 35 to the selector 44 can be permuted.

Although with the mode of control according to the invention, the value of the pressure in the column is not controlled to a predetermined value but is merely held within a wide range within which it can vary, it is often desirable to suppress rapid pressure fluctuations in the column. Preferably this suppression of the rapid pressure fluctuations in the column is attained by means of a controller which is affected both by the measured value of one of the four-mentioned controlled conditions (particularly the quality of the separation attained) and by the pressure or pressure variations in the column, but which, in the absence of any rapid pressure fluctuations, supplies a signal which depends only on the controlled condition in question. The output signal from the controller is used to control the degree of re-evaporation.

Figure 6:
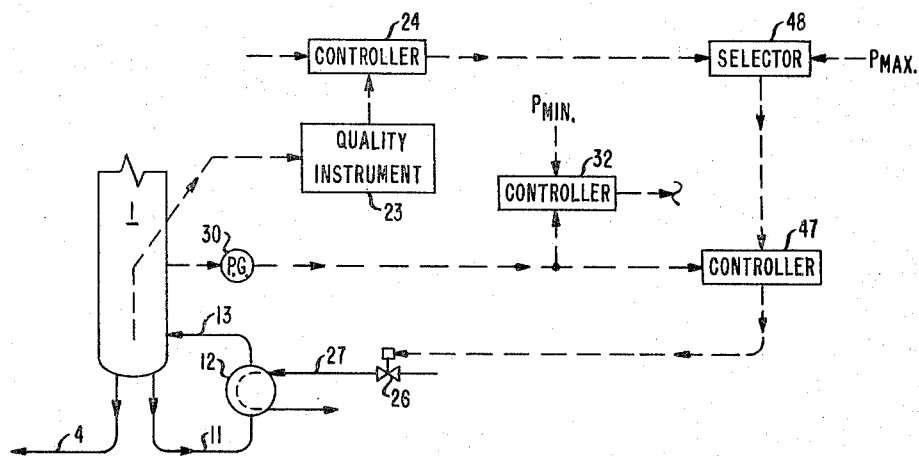
FIGURE 6 is a diagrammatic representation of a modification of a portion of the control schemes shown in FIGURES 1–5 for suppressing sudden pressure variations in the column.

FIGURE 6 shows a modification of the re-evaporation control of the preceding figures by which any sudden pressure variations in the column are suppressed via the valve 26 which controls the supply of heating medium to the reboiler 12. In this embodiment, the valve 26 is controlled by means of a controller 47 to the first input of which is supplied the signal corresponding to the pressure in the column from the gauge 30. The second input to the controller 47, which is the set point and is compared with the first input, originates in the controller 24, and is a signal corresponding to the measured value of one of the aforementioned controlled conditions, e.g., as shown in the figure, the quality of the bottom product. Before the output signal from the controller 24 is applied to the controller 47, however, the signal is passed to a selector 48 to which is also applied a set signal corresponding to $P_{max}$. The selector 48 which functions in the same manner as selector 25 in the embodiments shown in the preceding figures prevents the signal from the controller 24 from attaining a value higher than that corresponding to $P_{max}$. Although with this control scheme, the output of controller 47 will reflect any changes in pressure in column 1, since the set point of controller 47 is continually varying according to the output of controller 24, the pressure in the column will not be adjusted to any predetermined value but will still be free to adjust itself, within the predescribed range, to the optimum pressure which will result in the desired separation.

Under normal operating conditions, i.e., when the pressure neither is too high nor varies too rapidly, the supply of heating medium to the reboiler 12 is, therefore, controlled as dictated by the quality of the separation, i.e., the output of controller 24. If, however, the pressure in the column should vary rapidly, pressure gauge 30 and thereby controller 47 will re-act sooner than the quality instrument 23 and controller 24. As a result, the valve 26 will be rapidly further closed at a sudden rise in pressure and will be rapidly opened at a sudden pressure drop, thereby suppressing the sudden pressure variation. It should be noted that in place of the pressure gauge 30 it is possible to use a gauge system having an output proportional to the rate of pressure variation.

For further illustration of the method and apparatus for control according to the invention, some additional modifications are presented here which give partial alternatives to the embodiments already presented; it being understood that these do not exhaust the possibilities of actually carrying out the process according to the invention.

Figure 7:
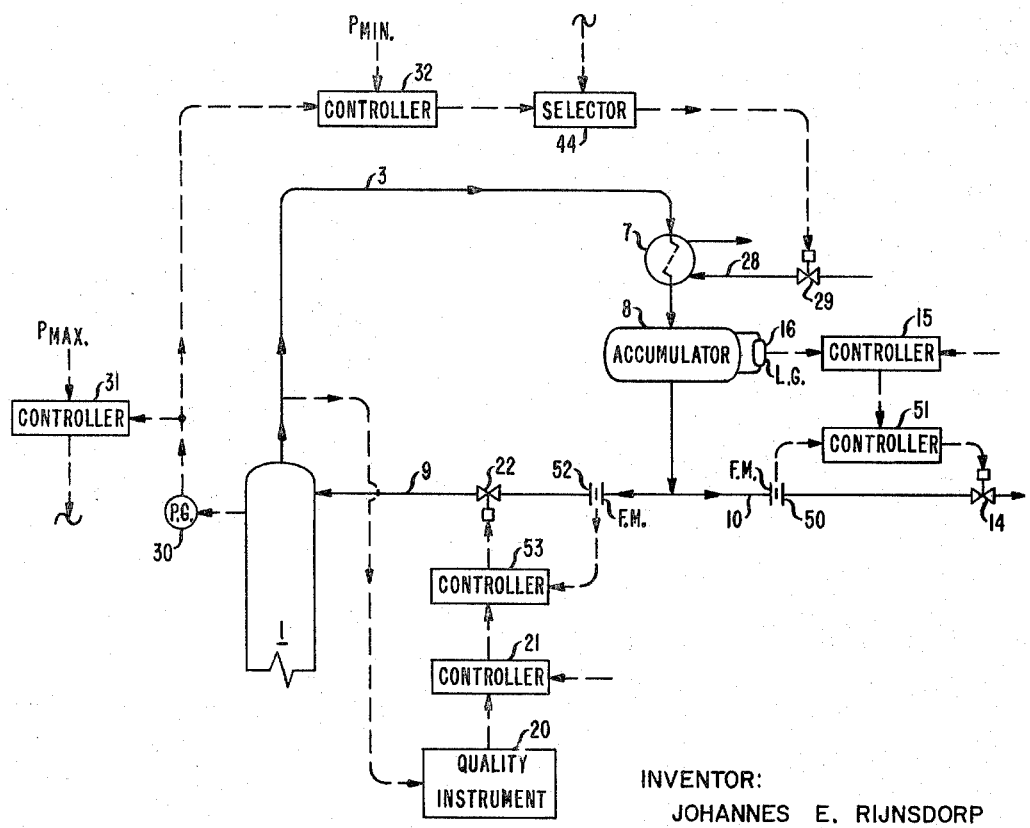
FIGURES 7–10 are diagrammatic representations indicating alternative control schemes for portions of the previously shown control schemes.

In the embodiment shown in FIGURE 7, the top product flow is controlled by means of a flow meter 50 connected to the pipeline 10 and a controller 51, while the reflux flow is controlled by means of a flow meter 52 connected to the line 9 and a controller 53. The controller 51 compares the output signal from the flow meter 50 and the output signal from the accumulator level controller 15 in a manner which tends to keep the top product flow at a constant value. However, when the level of the liquid in the accumulator 8 changes, the output of the controller 15 reflects this change and causes the controller 51 to open further the valve 14 in response to a rise in the level of the condensate in accumulator 8 and further close the valve 14 for a drop in the condensate level in the accumulator. The controller 53, which attempts to keep the reflux flow constant, compares the output signal from the flow meter 52 and the output signal from the top product quality controller 21. If the quality of the top product should change, the output signal from the controller 21 causes the controller 53 to open further the valve 22 if the quality of the top product is below specification and further close the valve 22 if the quality is above the desired specification.

Figure 8:
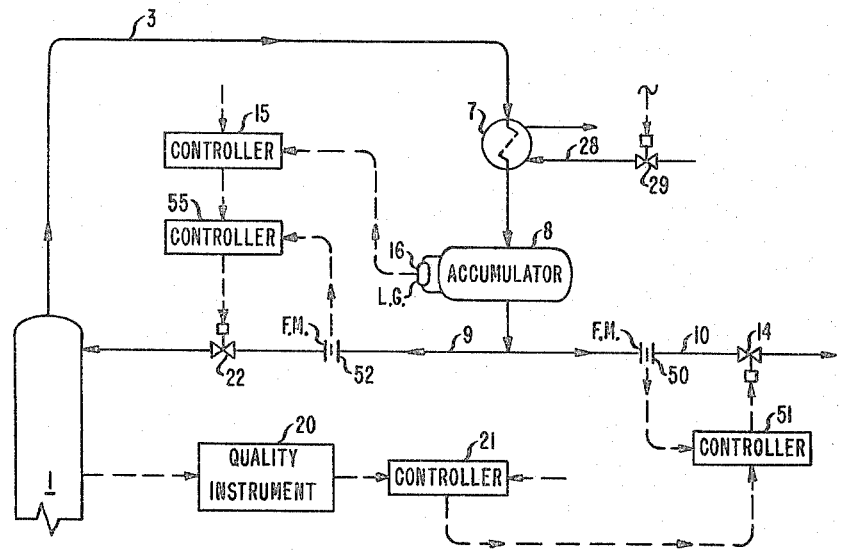

The control of the accumulator level and of the quality of the top product may take place according to the scheme of FIGURE 8. In this embodiment the quality instrument 20 and the controller 21 provide the set value for the controller 51 which compares this signal with the indication of the product-pipeline flow meter 50. The valve 14 is then adjusted by the controller 51 such that the top product meets the quality specification. The reflux flow rate obviously increases as the valve 14 is further closed and vice versa. This reflux flow is, however, controlled to maintain the liquid level in the accumulator. This is affected by the controller 53 which operates the valve 22. The controller 53 compares the indication of the flow meter 52 with a signal from the level controller 15 which is responsive to the level gauge 16.

Figure 9:
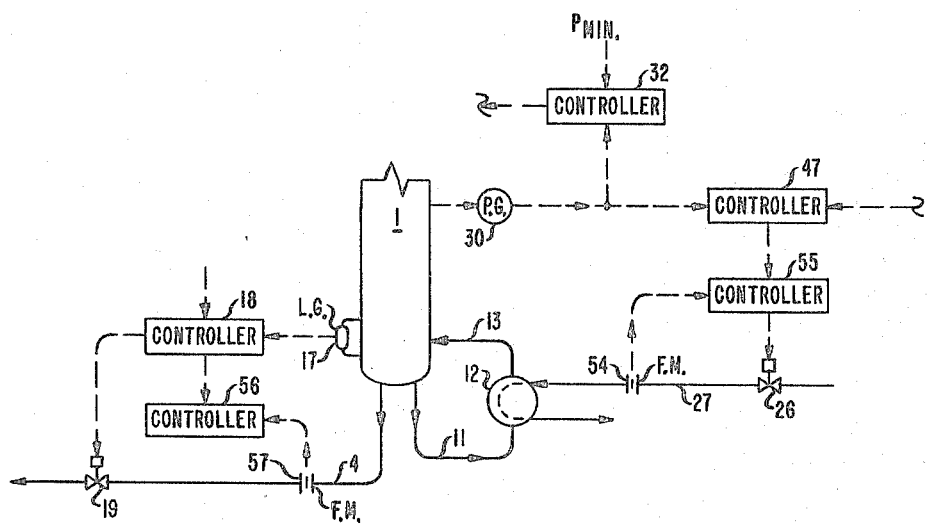

The control of the bottom level and of the quality of, for example, the bottom product, may also take place with the aid of flow meters and flow controllers. As shown in FIGURE 9, a flow meter 54 measures the flow of the heating medium to the reboiler and transmits a signal to a controller 55 which sets the valve 26 in the pipeline 27. The set value of the controller 55 originates from the controller 47 which is connected as was discussed above with regard to FIGURE 5 and similarly receives a set point signal indicative of quality. The bottom-level controller 18, which is coupled to the level gauge 17, supplies the set value for a controller 56 which receives a signal from the flow meter 57 in the bottom product discharge pipeline 4. The controller 56 then adjusts the valve 19 in the bottom product flow line 4 to the required position.

Figure 10:
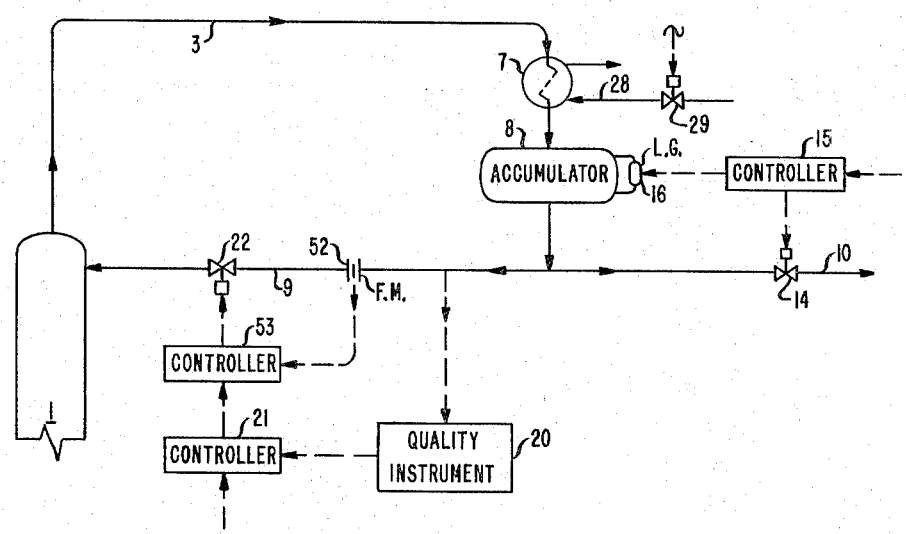

As shown in FIGURE 10, it is also possible to control the reflux merely by means of the flow meter 52 in the reflux line 9 which supplies a signal to the controller 53 to operate the reflux valve 22. The set value for the controller 53 is supplied by the top product quality controller 21 together with the quality meter 20.

Additionally several control schemes are possible in which a ratio controller is used as one of the two quality controllers. An occasion to do so will present itself if, for instance, the quality of the separation is expressed as the boiling point of that component which is distributed equally over top product and bottom product (cut point), and as the sharpness of separation (separation index). In this case a quality meter may be used for the control of the cut point and a ratio controller for the separation index.

Figure 11:
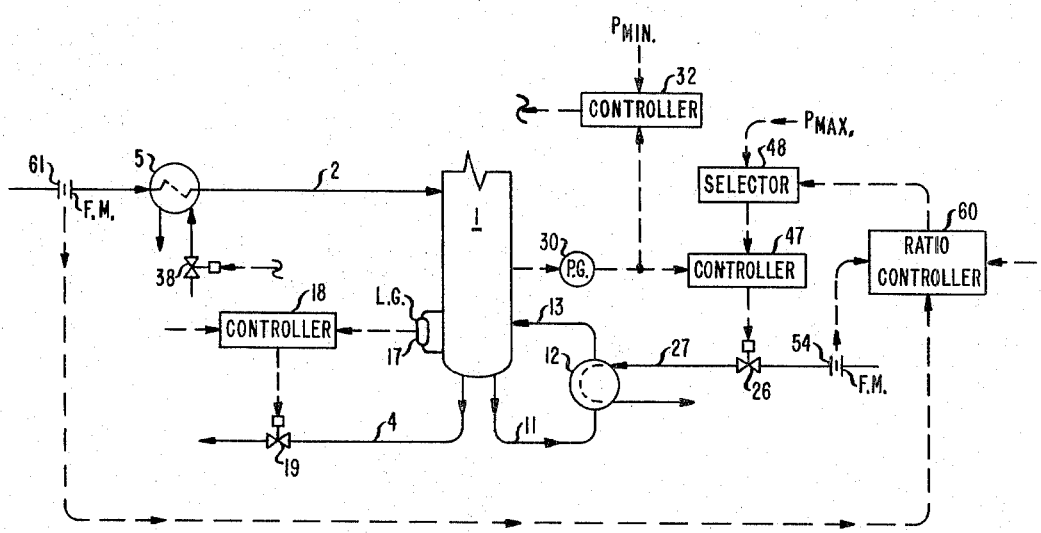
FIGURES 11–14 are diagrammatic representations showing variations of portions of the control schemes shown in the previous figures wherein ratio control is used for controlling the quality of the separation; and, FIGURE 15 is a diagrammatic representation showing a modification of FIGURE 5.
Figure 12:
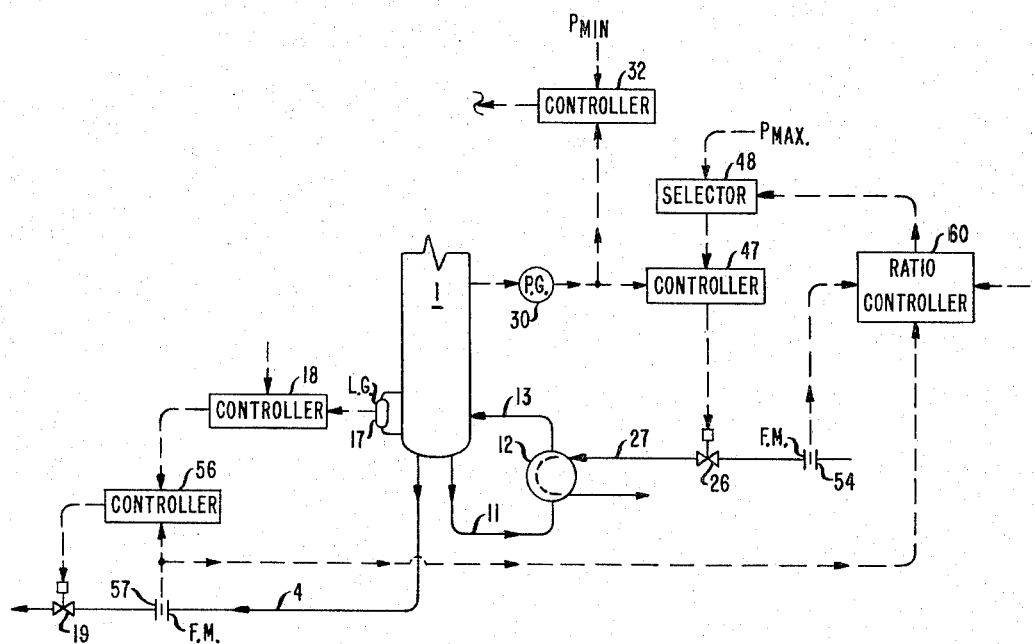

In FIGURE 11, a ratio controller 60 receives signals from the flow meters 61 and 54, located respectively in the feed line 2 and in the heating medium line 27. The output signal from ratio controller 60 is the set value of the controller 47. The controller 60 causes the flow of heating medium to conform to the feed flow. The flow meter 54 may also be placed in the reflux line 9. The controller 60 then controls, via selector 48 and controller 47, the flow of heating medium to the reboiler 12 in such a way that the controller 21 in FIGURES 1–5 changes the reflux until the ratio between feed flow and reflux reaches the desired value. Additionally, as shown in FIGURE 12, it is possible to use the flow meter 57 in the bottom product flow line 4, in lieu of the meter 61, to act together with the flow meter 54 in the heating medium line 27 to the reboiler 12. The outputs of these two flow meters are used as the inputs to the ratio controller 60.

Figure 13:
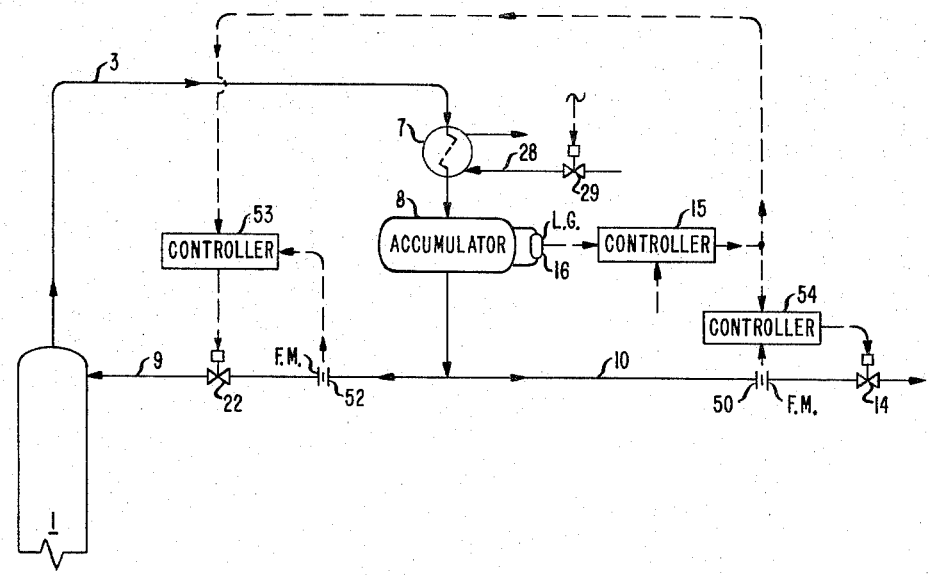
Figure 14:
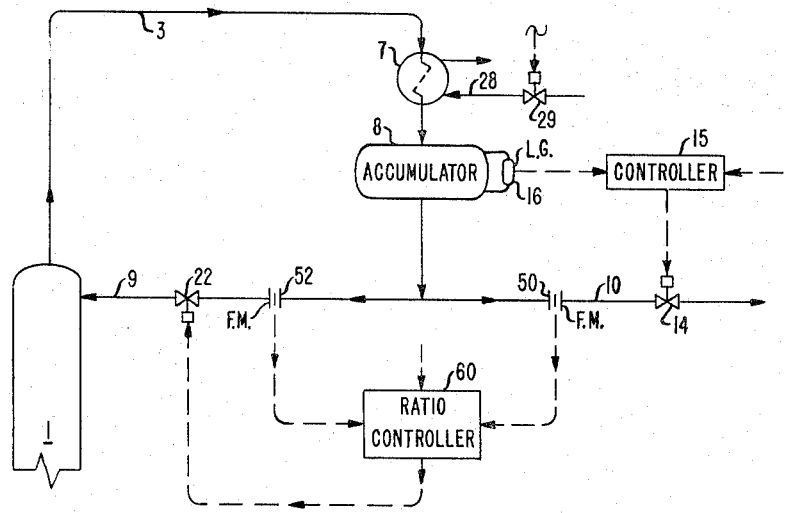

FIGURE 13 shows still another form of ratio control as an embodiment of the invention. The level controller 15, operated by the level gauge 16, supplies the set values for the controllers 51 and 53 which operate, respectively, the valve 14 in the top product flow line 10 and the valve 22 in the reflux line 9. The flow meters 50 and 52 are provided as described above and coupled to the controllers 51 and 53. With the control according to this scheme, the ratio between the top product flow and the reflux flow, as measured by the flow meters 50 and 52 respectively, and naturally also the level of the accumulator 8, are kept constant. As appears in FIGURE 14, the two meters 50 and 52 can also be connected to transmit their signals to the ratio controller 60, which then controls the reflux valve 22 in a similar manner.

A refinement of the control schemes, incorporating a ratio controller, is obtained by supplying the set value of the ratio controller via a computer, either analog or digital, which makes it possible to take account of the dependence of the desired ratio on the pressure in the column. Thus, for example at a lower pressure the reflux flow or the degree of re-evaporation can be adjusted at a relatively smaller value.

Figure 15:
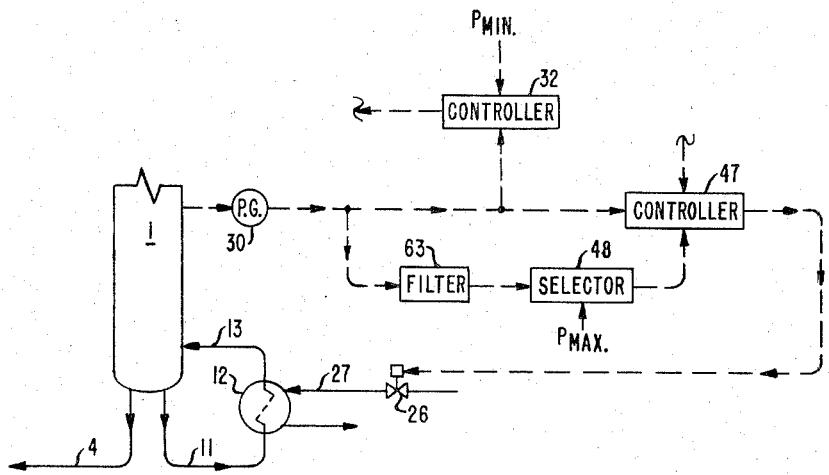

In some cases, for instance in the control scheme as shown in FIGURE 6, where use is made of a difference between the signals from the pressure gauge 30 and the quality meter 23 in order to suppress rapid pressure variations via the control valve 26, it is attractive to make use of a damping filter as shown in FIGURE 15. The filter 63 and the selector 48 are connected between the pressure gauge 30 and the controller 47 and a direct connection is provided between the pressure gauge 30 and the controller 47. The filter 63 does not pass signal variations originated by rapid pressure variations. These signals pass via the direct connection to the controller 47, which then, as explained above, adjusts the valve 26. Only signals originating from slow pressure variations are passed by the filter 63. Of course, such signals also follow the direct course from the pressure gauge 30 to the controller 47. However, the two signals are fed to the control mechanism of controller 47 in opposition, i.e., in such a way that they cancel each other. As a result, slow pressure variations below $P_{max}$. no longer have any influence on the position of the control valve 26. However, when $P_{max}$. is exceeded the selector 48 transmits an overriding signal to the controller 47 to move the valve 26 toward closed position. The output signal from controller 47 is, in the former case, controlled entirely by the set value of controller 47, which signal is supplied, for instance, by a quality controller or a ratio controller, as has been discussed hereinbefore in connection with the prior embodiments.

It is understood that the quality meters mentioned hereinbefore may be direct quality meters such as chromatographic analysis apparatus, infrared or ultra-violet absorption apparatus, viscometers, refractive index meters, or flash point meters. For this purpose one may also use temperature meters compensated for pressure variations, meters for the difference in temperature between two trays, meters for the difference in vapor pressure between the product obtained and the desired product or, under certain conditions, controllers for the ratio of two flows. It is further understood that it is not necessary to connect the quality meter directly to the top product or to the bottom product discharge lines which lead from the column or to the accumulator outlet. Sometimes it may be desirable, for instance in view of the accuracy of the quality meter, to connect this meter to the mixture on a selected tray in the column having regard to the nature of the distillation process to select a stage which is effective to yield meaningful data on which control can be based; nor is it necessary that the locations of the valves 26 and 29 be as invariably indicated in the drawings. Thus the valve 26, for instance, may alternatively be placed in the discharge line of the heating medium from the reboiler. When this medium is steam, the valve 26 should be located in the condensate discharge line. The valve 29 may be similarly located in the discharge line of the cooling medium. This valve may also be located in the line 3 or in the condensed vapor line between the condenser 7 and the accumulator 8. In all cases, however, the valve 29 governs the heat transfer from vapor flow to cooling medium.

Tray loads can be measured with a meter which produces an output signal proportional to the pressure difference across one or more trays; with a heat conductivity meter in the space over the tray or with any other standard measuring system for this purpose. Furthermore, the tray loads can be calculated from process conditions utilizing for example, an analog computer.

It is further understood that the control systems mentioned hereinbefore may be pneumatic, hydraulic, electric, electronic or mechanical systems or may constitute a mixture of these types.

I claim as my invention:

1. In a process for the continuous distillation of a stream of intake mixture which is carried out at super-atmospheric pressure in a multitray distillation column having both rectifying and stripping sections, wherein the overhead vapors are condensed in a condenser and collected in an accumulator; wherein both reflux in the upper portion and re-evaporation in the bottom portion of the column are used; and wherein the amount of reflux, the degree of re-evaporation, the top product flow and the bottom product flow are controlled such that the top product accumulator level and the bottom product level in the column are adjusted to predetermined respective levels and the desired quality of the separation is attained, the improvement comprising: allowing the pressure in the column to freely adjust itself between the maximum and minimum permissible operating pressures for the column; controlling the flow of cooling medium to the condenser, said control being in a direction to supply the maximum amount of cooling to the condenser; measuring the pressure in said column, reducing said flow of cooling medium only when said measured pressure equals the minimum permissible column pressure; providing preheating for the stream or intake mixture, controlling the preheating of the intake mixture to the column, said control being in a direction to supply a minimum quantity of preheat; measuring the load on the trays of the stripping section of said column, increasing the preheat only when said measured load equals the maximum permissible load on the trays of the stripping section; measuring the load on the trays of the rectifying section of the column, reducing the flow of cooling medium only where said measured load equals the maximum permissible load on the trays of the rectifying section; whereby the costs of operating the distillation column are minimized when the distillation takes place in a pressure range where the tray load decreases with increasing pressure and where the cost of the heating medium used for preheating the feed is relatively expensive in comparison with the heating medium used for re-evaporation.

2. The process of claim 1 wherein the column pressure is maintained between the maximum and minimum permissible pressures for column by: measuring the pressure in the column; reducing the flow of cooling medium to the condenser whenever the measured pressure is below a preset value corresponding to the minimum permissible pressure; and decreasing the degree of re-evaporation whenever the measured pressure is above a preset value corresponding the maximum permissible column pressure.

3. The process of claim 2 wherein overloading of the trays of the stripping section is prevented by: increasing the degree of preheating of said stream of intake mixture whenever the maximum permissible load on the trays of the stripping section of the column is exceeded.

4. The process of claim 2 wherein overloading of the trays of the stripping section is prevented by: increasing the preheating of said stream of intake mixture whenever the load of the trays of said stripping sections exceeds a value slightly less than the maximum permissible value for said trays; and, reducing the flow of condenser cooling medium whenever the maximum permissible load for the trays of said stripping section is exceeded.

5. The process of claim 3 including the step of also reducing the flow of condenser cooling medium to eliminate overloading of the trays of the stripping section of the column.

6. The process of claim 3 including the step of reducing the flow of condenser cooling medium whenever the maximum permissible load of the trays of the stripping section is exceeded and the degree of preheating of the intake mixture for the column has already been increased to the maximum possible value.

7. The process of claim 2 wherein the step of suppressing sudden pressure variations in the column comprises: adjusting the flow of heating medium utilized for re-evaporation by a control signal proportional to the difference between (1) a signal proportional to the measured pressure in the column and (2) a signal proportional to the quality of at least one of the top and bottom products, whereby sudden pressure variations in the column are suppressed without the pressure itself being controlled to a constant value.

8. In an apparatus for the continuous distillation of a stream of intake mixture at superatmospheric pressure in a multitray distillation column having both a rectifying and a stripping section, and utilizing both reflux in the upper portion and re-evaporation in the lower portion of the column wherein: a condenser and an accumulator are connected to the distillation column to collect the top product; a reboiler is connected to the bottom portion of the distillation column; said improvement comprising: a top product flow control valve, said top product flow control valve being disposed to control the flow of top product from the column to the condenser; a bottom product flow control valve, said bottom product flow control valve being disposed to control the flow of bottom product from the column; a reflux line, said reflux line connecting the accumulator to the column and having a reflux flow control valve disposed therein; a heat flow control valve, said heat flow control valve being disposed to control the quantity of heating medium supplied to the reboiler; a coolant flow control valve, said coolant flow control valve being disposed to control the flow of cooling medium to the condenser; pressure-measuring means disposed to measure the pressure in the column; a first controller, said first controller being coupled to both said pressure-measuring means and said coolant flow control valve, said first controller being operable to open said coolant flow control valve to its maximum position and close said coolant flow control valve only when the column pressure equals the minimum permissible column pressure; a second controller, said second controller being coupled to said pressure-measuring means and said heat flow control valve, said second controller being operable to control said heat flow control valve to maintain said column pressure below the maximum permissible column pressure; a preheater, said feed preheater having a third controller to control the quantity of preheat supplied to the intake mixture; a first tray load gauge disposed to measure the load on the trays in the stripping section of the column, said first tray load gauge being coupled to said third controller to operate said third controller to supply the minimum quantity of preheat to the intake mixture required to keep the load on the trays in the stripping section below the maximum permissible load; a second tray load gauge disposed to measure the load on the trays of the rectifying section of the column; a fourth controller, said fourth controller being coupled to both said second load tray gauge and said coolant flow control valve to close said coolant flow control valve when the maximum permissible load on said rectifying section trays is exceeded.

References Cited
UNITED STATES PATENTS

| | | | |
|---|---|---|---|
| 2,489,949 | 11/1949 | Blair | 196—132 |
| 2,910,521 | 10/1959 | Cobb | 203—2 |
| 3,034,307 | 5/1962 | Berger | 202—160 X |
| 3,071,520 | 1/1963 | Smalling | 202—160 |
| 3,249,519 | 5/1966 | Cabbage et al. | 203—2 |

WILBUR L. BASCOMB, JR., *Primary Examiner.*